United States Patent
Faizan et al.

(10) Patent No.: US 12,211,384 B2
(45) Date of Patent: Jan. 28, 2025

(54) SMART RESCUE SYSTEM COORDINATED WITH AN INTERACTIVE APPLICATION

(71) Applicant: Mirza Faizan, Irving, TX (US)

(72) Inventors: Mirza Faizan, Irving, TX (US); Mirza Rizwan, Patna (IN); Aarifa Fatima, Patna (IN); Ayesha Fatima, Patna (IN); Ashaz Haque, Patna (IN); Kaushiki Mudgal, Bristol (GB); Abhudya Sharma, Bristol (GB); Zayan Tabish, Sydney (AU); Zayed Tabish, Sydney (AU); Daanya Tabish, Sydney (AU); Shayan Naiyar Taban, Kuala Lumpur (MY); Mikhail Imtiaz, Carrollton, TX (US); Sama Fatima, Carrollton, TX (US); Mishaal Fauzan Qureshi, Frisco, TX (US); Aroush Fatima, Patna (IN); Saadia Asaf, Aligarh (IN); Mansoor Hasan Khan, Aligarh (IN); Aiman Fatima Jamadar, Cary, NC (US)

( * ) Notice: Subject to any disclaimer, the term of this patent is extended or adjusted under 35 U.S.C. 154(b) by 354 days.

(21) Appl. No.: 17/464,237

(22) Filed: Sep. 1, 2021

(65) Prior Publication Data
US 2023/0069173 A1    Mar. 2, 2023

(51) Int. Cl.
*G08G 1/00* (2006.01)
*G08G 1/087* (2006.01)
*H04W 4/021* (2018.01)
*H04W 4/12* (2009.01)
*H04W 4/90* (2018.01)
*H04W 68/00* (2009.01)

(52) U.S. Cl.
CPC ............. *G08G 1/202* (2013.01); *G08G 1/087* (2013.01); *H04W 4/021* (2013.01); *H04W 4/12* (2013.01); *H04W 4/90* (2018.02); *H04W 68/005* (2013.01)

(58) Field of Classification Search
CPC ............................... H04W 4/90; G08G 1/202
See application file for complete search history.

(56) References Cited

U.S. PATENT DOCUMENTS

| | | | | |
|---|---|---|---|---|
| 10,032,372 | B1* | 7/2018 | De Nava | G08G 1/096716 |
| 2003/0098801 | A1* | 5/2003 | Martin | G08G 1/0965 |
| | | | | 340/902 |
| 2004/0143466 | A1* | 7/2004 | Smith | G08G 1/202 |
| | | | | 705/6 |
| 2012/0038490 | A1* | 2/2012 | Verfuerth | G08G 1/04 |
| | | | | 340/917 |
| 2017/0344707 | A1* | 11/2017 | Patel | G08G 1/202 |

(Continued)

*Primary Examiner* — Jess Whittington

(57) ABSTRACT

A smart rescue system 100 is disclosed. The system 100 includes a mobile device 101 allowing a requester to request for ambulance services, a network 102, and a server 103 communicatively coupled with the mobile device 101 through network 102. The requester provides details including patient's address. The server 103 includes a geo-location system 104 to automatically determine the ambulance available in a geo-spatial vicinity of the patient's address, a notification system 106 to notify a driver of the ambulance available in a geo-spatial vicinity of the requested address, a navigation system 105 to navigate the driver to a nearest medical centre in a geo-spatial vicinity of the patient's address, and recognizes upcoming traffic lights up to a certain distance in advance, and a microchip technology 107 fitted in the traffic lights controlled by the server 103.

6 Claims, 7 Drawing Sheets

(56) References Cited

U.S. PATENT DOCUMENTS

| | | | | |
|---|---|---|---|---|
| 2018/0077551 | A1* | 3/2018 | Kalathil | H04W 4/90 |
| 2018/0233046 | A1* | 8/2018 | Kim | G08G 1/164 |
| 2018/0309592 | A1* | 10/2018 | Stolfus | H04L 43/062 |
| 2020/0058410 | A1* | 2/2020 | Khouri, III | G16H 80/00 |
| 2021/0043083 | A1* | 2/2021 | Bandi | G08G 1/096716 |
| 2021/0225168 | A1* | 7/2021 | Hoh | G08G 1/012 |

* cited by examiner

SMART RESCUE SYSTEM COORDINATED WITH AN INTERACTIVE APPLICATION

FIELD OF THE INVENTION

The present invention relates to a smart rescue system, and particularly, a server controlled system for rescue to be done by ambulances, and which is coordinated with an interactive application accessible by authorized people.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

More than 20% of emergency patient's deaths are caused by ambulance delays, that is quite a big fraction and around ¼ of serious or lifetime injuries are caused by ambulance delays. There are many causes of ambulance delays, be it inefficient drivers, non-cooperative society, poor infrastructure, lack of informing facilities, etc. On of the most common reasons of delay is that the ambulances often get stuck in the traffic. If the delay caused by the traffic lights waiting is avoided, the ambulances are likely to reach to the people in need of medical treatment and also take them to the hospitals in less time.

Is is realized that if an efficient and consistent system is emplaced, a lot of casualties and injuries can be prevented.

Therefore, there arises a need to provide a smart rescue system, and particularly, a server controlled system for rescue to be done by ambulances, and which is coordinated with an interactive application accessible by authorized people.

OBJECTIVE OF THE INVENTION

The present disclosure is aimed at providing a server controlled smart rescue system, and which is coordinated with an interactive application, reduces the delays caused due to traffic, and is coordinated with an interactive application accessible by authorized people for managing ambulance services.

Another object of the present invention is to provide a server controlled smart rescue system that is reasonable.

Yet another object of the present invention is to provide a server controlled smart rescue system that is coordinated with a navigation system to let the ambulances chose the shortest path.

SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

According to an embodiment of the present disclosure, a smart rescue system comprises a mobile device allowing a requester to request for ambulance services, a network, and a server communicatively coupled with the mobile device through network. The requester provides details including patient's address. The server includes a geo-location system to automatically determine the ambulance available in a geo-spatial vicinity of the patient's address, a notification system to notify a driver of the ambulance available in a geo-spatial vicinity of the requested address, a navigation system to navigate the driver to a nearest medical centre in a geo-spatial vicinity of the patient's address, and recognizes upcoming traffic lights up to a certain distance in advance, and a microchip technology fitted in the traffic lights controlled by the server.

According to an embodiment, the notification system comprises a ping notification technology.

According to an embodiment, the driver of the ambulance available accepts the request through an interactive application installed in a mobile device, or through hotline emergency services.

According to an embodiment, the server stores data entered by the requester and live location of the ambulance available.

According to an embodiment, the navigation system recognizes upcoming traffic lights up to a distance of 2 km (from the ambulance available) in advance.

According to an embodiment, the navigation system turns the upcoming traffic lights green.

According to an embodiment, the server comprises a memory to store patient details entered by the ambulance driver and examining staff in the ambulance available and a communication unit to communicate the stored patient details to the nearest hospital, the navigation system identifies.

According to an embodiment, a method of smart rescue comprises requesting, by a mobile device, for ambulance service for patient; determining, by a server, an ambulance available in a geo-spatial vicinity of the patient's address; accepting, by a mobile device, request for ambulance by a driver of the ambulance available; navigating the ambulance, by the server, to provide a shortest path to reach the patient and a nearest hospital; and recognizing and controlling, by the server, upcoming traffic lights in the path up to a certain distance in advance.

According to an embodiment of the present invention, the method comprises saving details including address of patient, patient's details as provided by requester, live location of the ambulance available, and patient details entered by the ambulance driver and examining staff in the ambulance available, wherein the saved details are communicated to the nearest hospital the navigation system identifies.

According to an embodiment, turning the upcoming traffic lights green up to a distance of 2 Km.

BRIEF DESCRIPTION OF DRAWINGS

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

Figure 1:
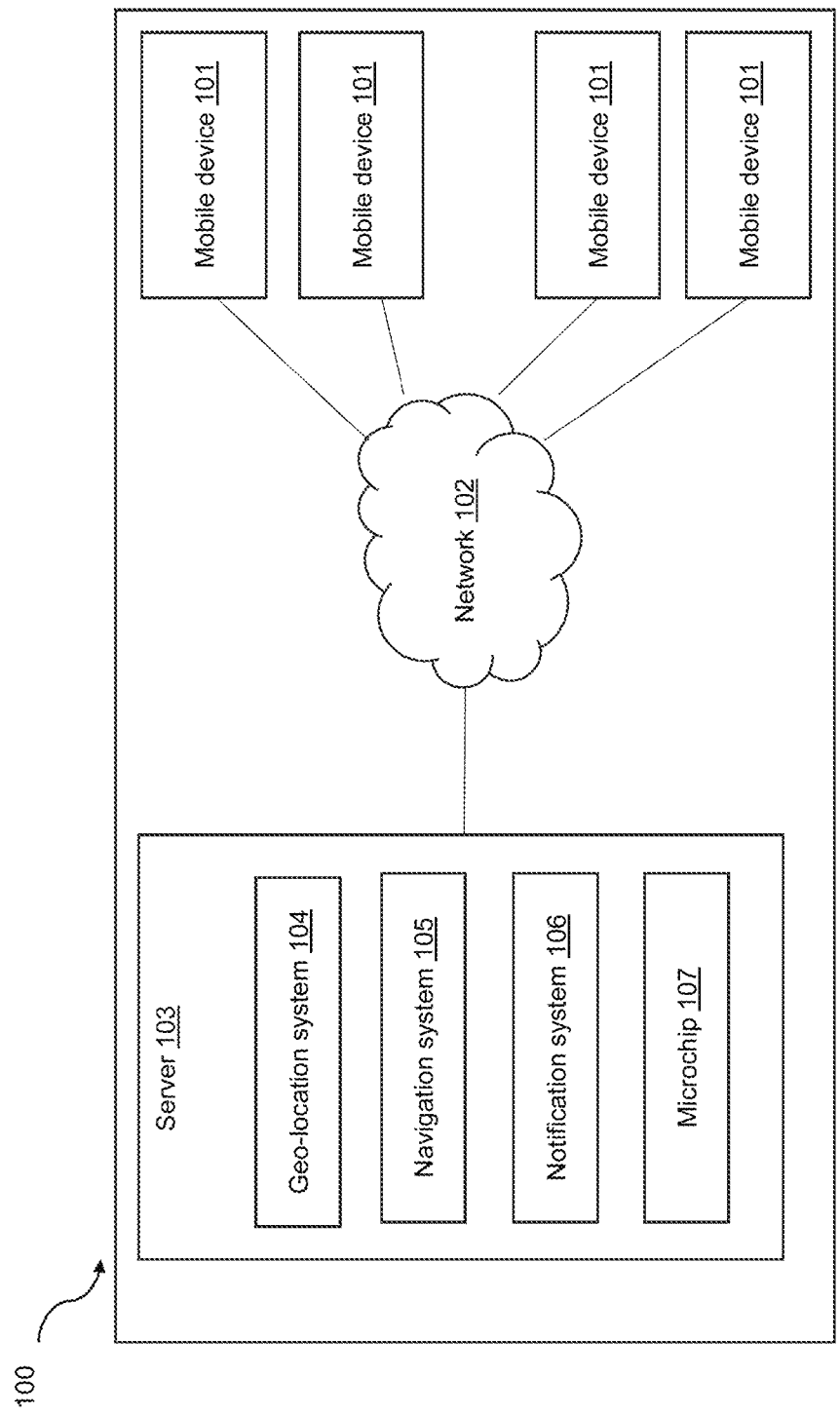
FIG. 1 illustrates a basic structure of the smart rescue system, according to an embodiment of the invention.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The term "some" as used herein is to be understood as "none or one or more than one or all." Accordingly, the terms "none," "one," "more than one," "more than one, but not all" or "all" would all fall under the definition of "some." The term "some embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skills in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below. Embodiments of the present invention will be described below in detail with reference to the accompanying drawings.

The present invention provides a smart rescue system 100 (hereinafter "system" 100) that includes smart management of availing ambulance services to people in need. FIG. 1 illustrates a basic structure of the smart rescue system 100, according to an embodiment of the invention. The system 100 may be server 103 based and accessible by authorized person only. Though, any one feeling a need of calling an ambulance either for himself/herself or someone else may make a request, the server 103 may direct the request to such a driver, who can easily and rapidly reach at the location. Further, the server 103 may help the driver reach the destination in minimum time and avail medical services in time.

Further the server 103 may comprise a geo-location system 104 that may automatically determine the ambulance available in a geo-spatial vicinity of the patient's address, navigation system 105 notification system 106 and microchip 107.

Figure 2A:
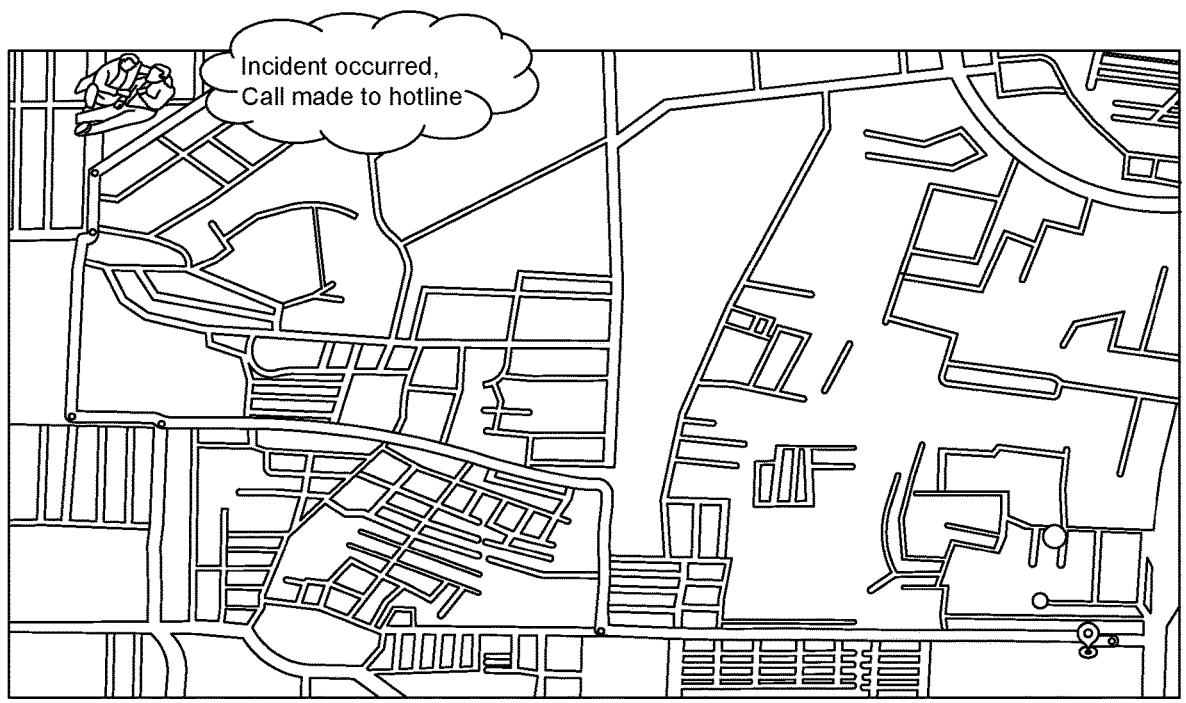
FIG. 2A-2I illustrates an overall process of operating the smart rescue system, according to an embodiment of the present invention.

In an embodiment, the system 100 may comprise a mobile device 101, a network 102, and a server 103 for controlling the operation of the system 100. FIG. 2*a* illustrates the step of making a request for ambulance services, according to an embodiment of the present invention. The mobile device 101 may be a smart phone, a tablet or any other mobile device 101 adapted to perform a minimum function of either calling on a specified number or an emergency service. In an embodiment, the mobile device 101 may be a normal calling cellphone, through which any person may make a call on a hotline emergency services to make a request to call an ambulance. In another embodiment, the mobile device 101 may be a smart mobile phone with an interactive application installed therein. The interactive application may be specifically designed to make ambulance services available and controlling the same. The patient may make a request himself/herself if the condition allows so, or any relative or anyone witnessing the situation of the patient may make the request.

Figure 2B:
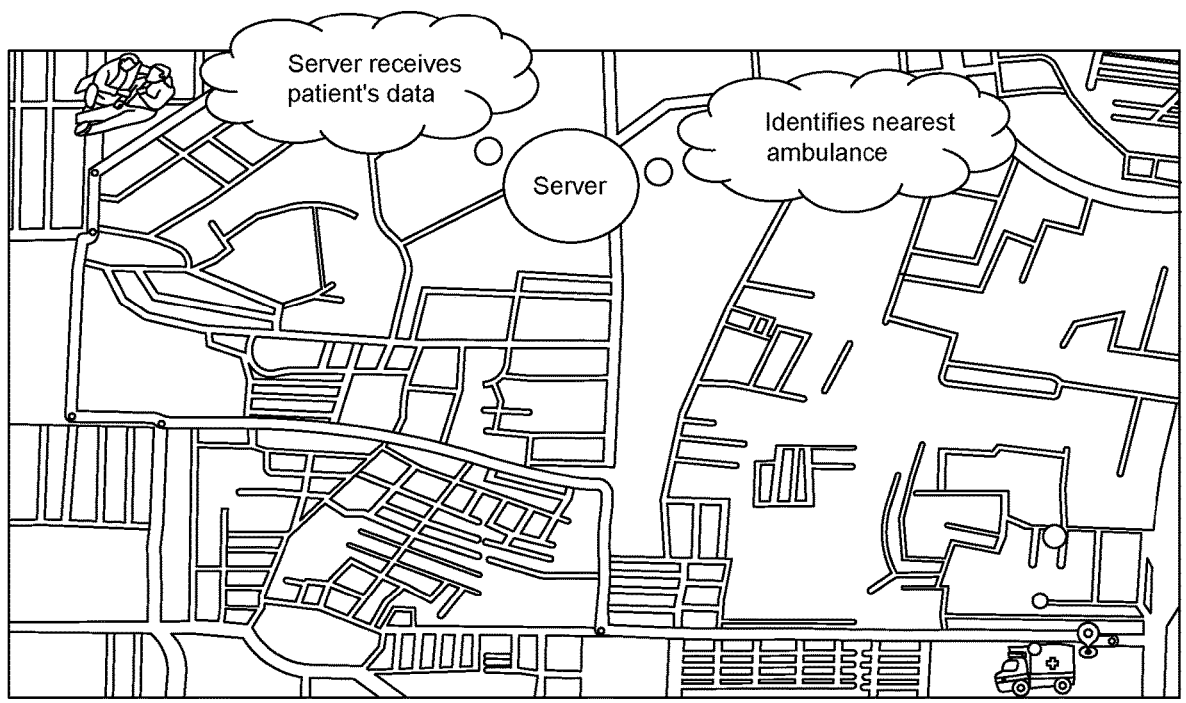

The mobile device 101 may be connected to the server 103 through the network 102. The server 103 may receive the request. The server 103 may also receive additional details entered by the requester. The additional details may be a part of required details or optional details according to embodiments. In an exemplary embodiment, the address of the patient may be required while the name of the patient may be optional. In yet another embodiment, the condition of the patient may also be required to be furnished by the requester. FIG. 2b illustrates step of determining the ambulance available for the patient, according to an embodiment of the present invention. The server 103 may be an IoT server 103 that may save details of the patient as received by the requester. The server 103 may comprise a geo-location system 104 that may automatically determine the ambulance available in a geo-spatial vicinity of the patient's address. The geo-spatial vicinity of the patient's address may vary depending on the system 100 settings. In an exemplary embodiment, the system 100 may be adapted to identify ambulances within a range of 2 Km, while in another embodiment, the system 100 may be adapted to identify ambulances within a range of 5 Km. The geo-location system 104 may then determine the ambulance closest to the patient's address and if the ambulance is available.

Figure 2C:
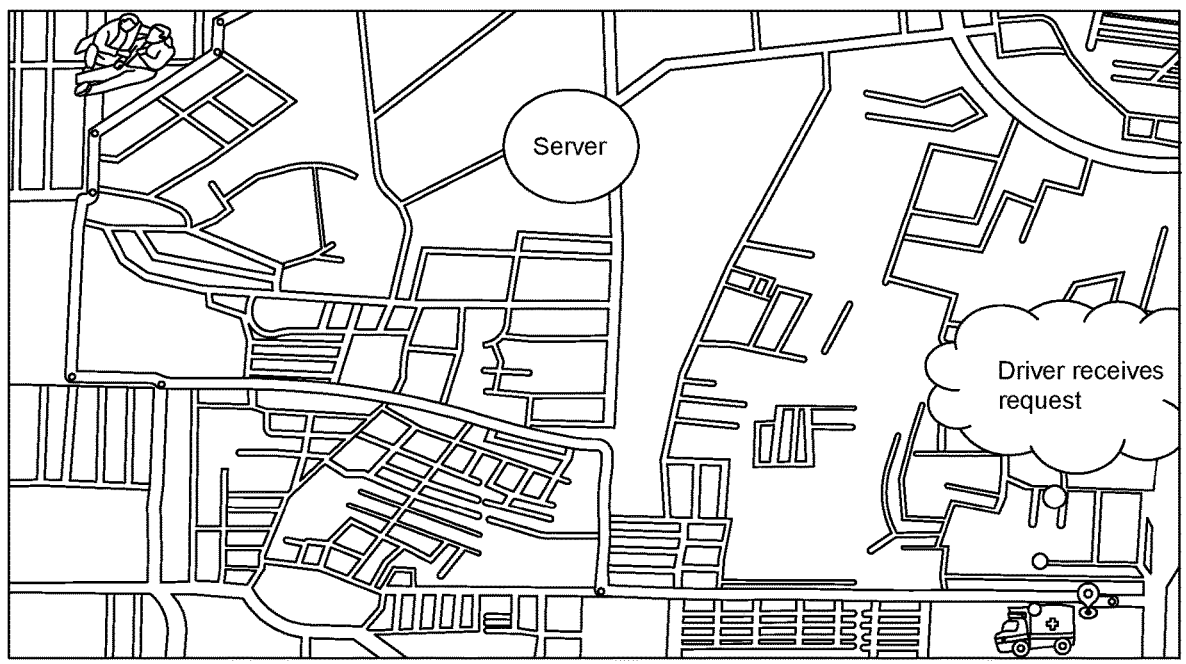

FIG. 2c illustrates step of receiving request by a driver of the ambulance, according to an embodiment of the present invention. The server 103 may comprise a notification system 106 to notify the driver of the ambulance that has been identified by the geo-location system 104. The driver may be an authorized person having access to the server 103 through the network 102. In an embodiment, the server 103 may comprise a ping notification system to notify the driver of the request made by the requester, by a ping on the driver's device. The driver's device may be any mobile device 101 in the network 102 communicatively connected to the server 103. In an embodiment, the driver may have a mobile phone connected to the server 103 over which the driver may receive the notification. In another embodiment, the ambulance may comprise a mobile device 101 attached to/or placed in the ambulance that may be connected to the server 103 and receive a notification of the request received.

Figure 2D:
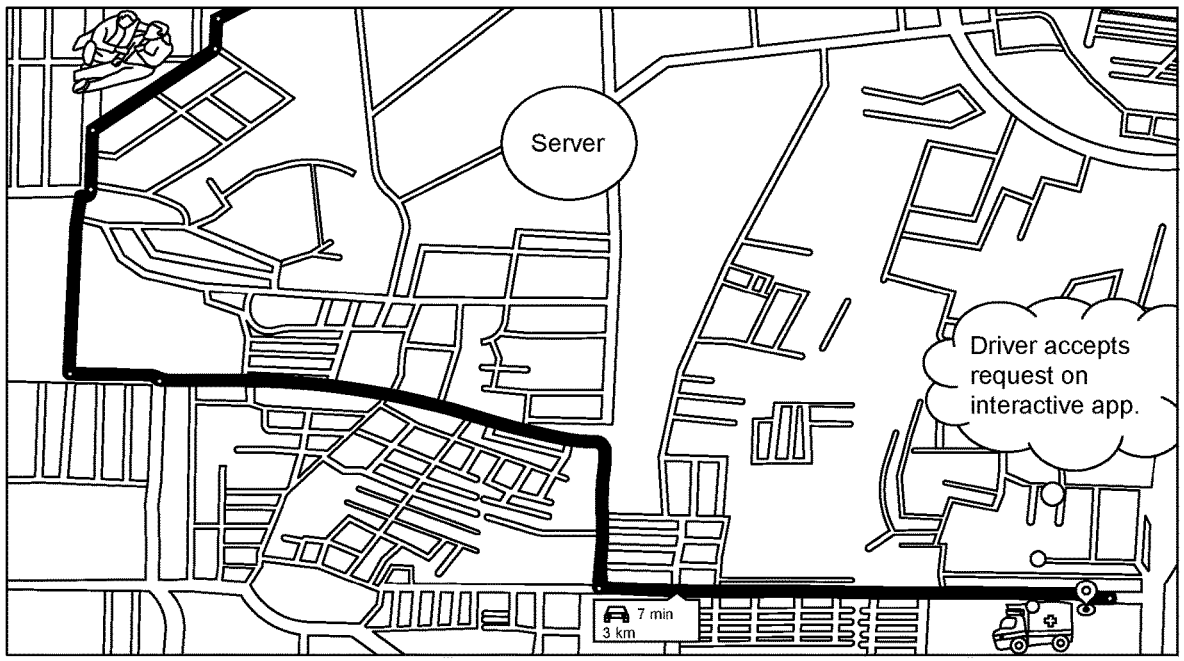

FIG. 2d illustrates step of accepting request by a driver of the ambulance, according to an embodiment of the present invention. The driver may accept the request based on the availability of the services. There might be a situation where the driver may not be able to take the ambulance to the patient. In case the driver finds it possible to take the ambulance to the patient, he may accept the request. The driver may accept the request on the interactive application installed in the mobile device 101 of the driver.

Figure 2E:
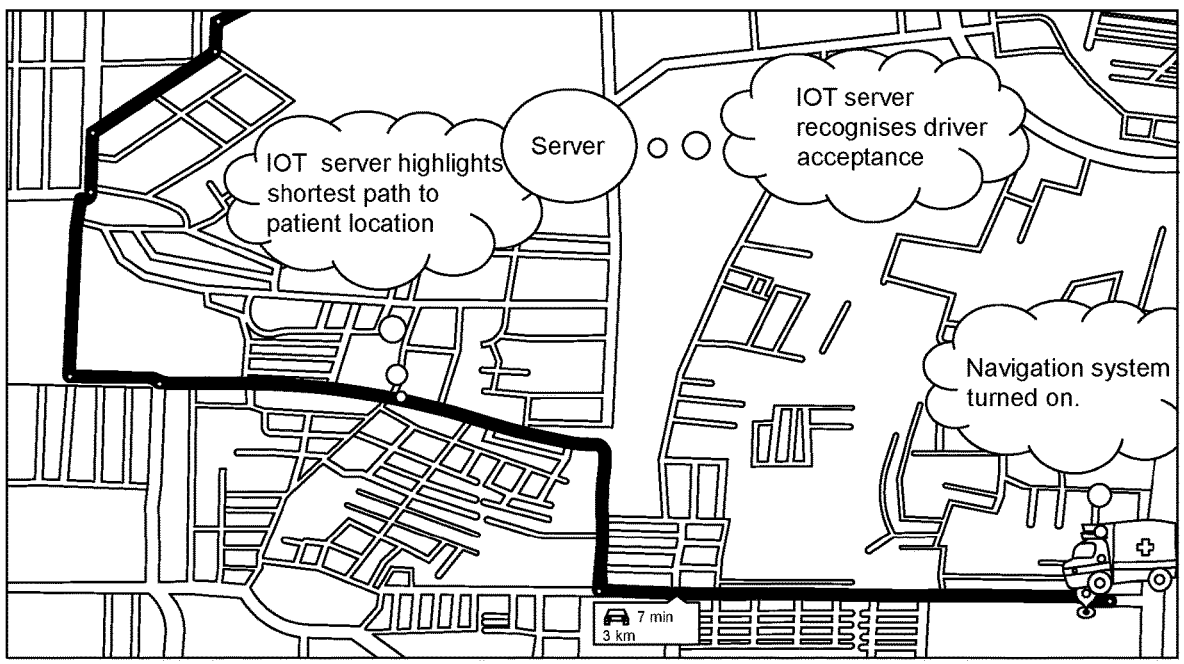

FIG. 2e illustrates step of ambulance proceeding to the patient, according to an embodiment of the present invention. The acceptance of the request by the driver of the ambulance available may be recognized by the IoT server 103. Once the acceptance is recognized, the navigation system 105 in the server 103 may be turned on. The navigation system 105 may highlight the fastest path to reach the patient. In an embodiment, the navigation system 105 may take into consideration the traffic in the path, distances of all the available paths leading to the patient, any road congestion, etc. The driver may start the trip to the patient. The geo-location system 104 in the server 103 may feed to the IoT server 103, the live location of the ambulance while travelling to the patient's address. The live location of the ambulance may be fed to IoT server 103 in real time. Therefore, the server 103 may take note of where the ambulance is, how much time it is taking or going to take to reach the patient.

Figure 2F:
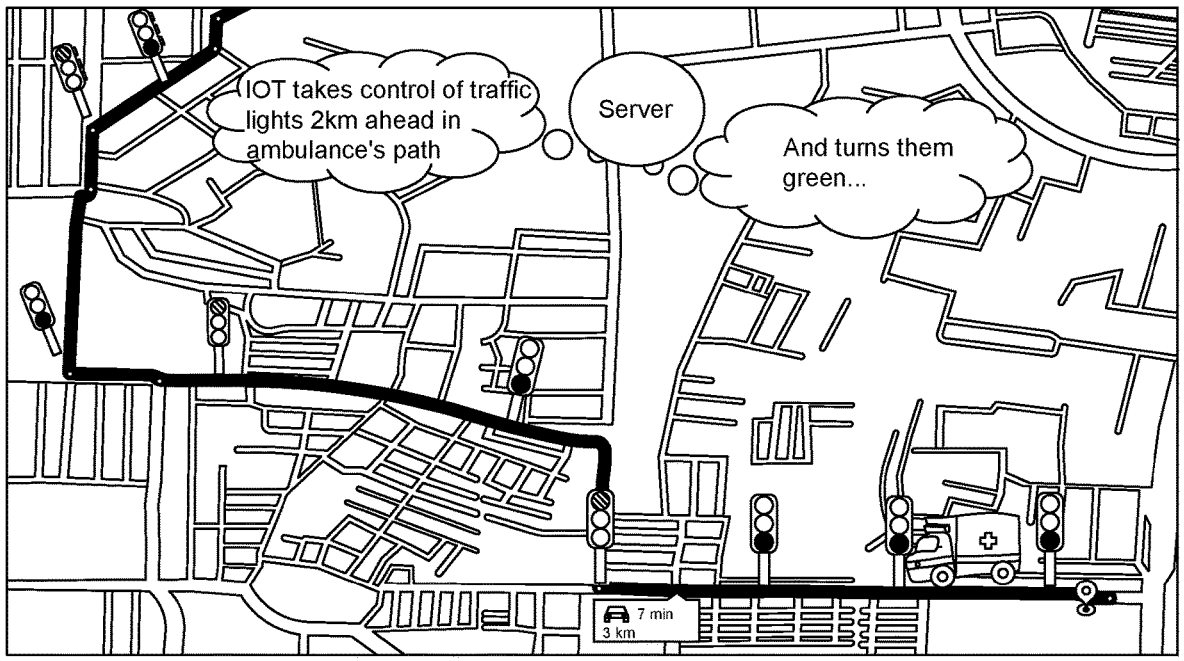
Figure 2G:
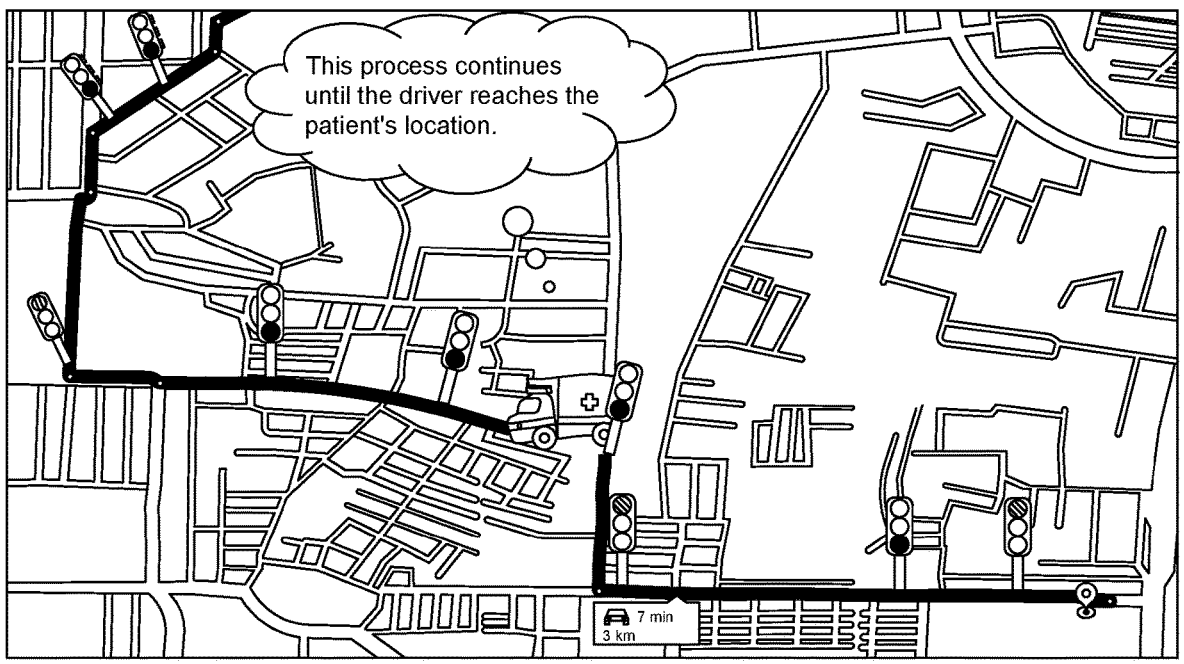

FIG. 2f illustrates step of controlling traffic lights in the path, according to an embodiment of the present invention. There may be a microchip technology 107 (interchangeably used as "microchip" 107) fitted in the traffic lights. The microchip 107 may transmit signals up to a certain distance. In an embodiment, the distance may be up to 2 Kms in an embodiment. In another embodiment, the distance may be up to 5 Kms, depending on the type of microchip 107 installed in the traffic lights. The ambulances in the network 102 may be fitted with a receiver adapted to receive the signals transmitted by the microchip 107 in the traffic lights. Therefore, the ambulance in the range of the specified distance, may recognize the upcoming traffic lights in the distance range. The IoT server 103 may control the traffic lights as per the navigation path within the distance range as specified, and mainly 2 Kms. The IoT server 103 may turn the recognized traffic lights green so as not to let the ambulance wait there due to the traffic signals and also the traffic due to these signals. Therefore, the ambulance may reach the patient in time as illustrated in FIG. 2i.

Figure 3:
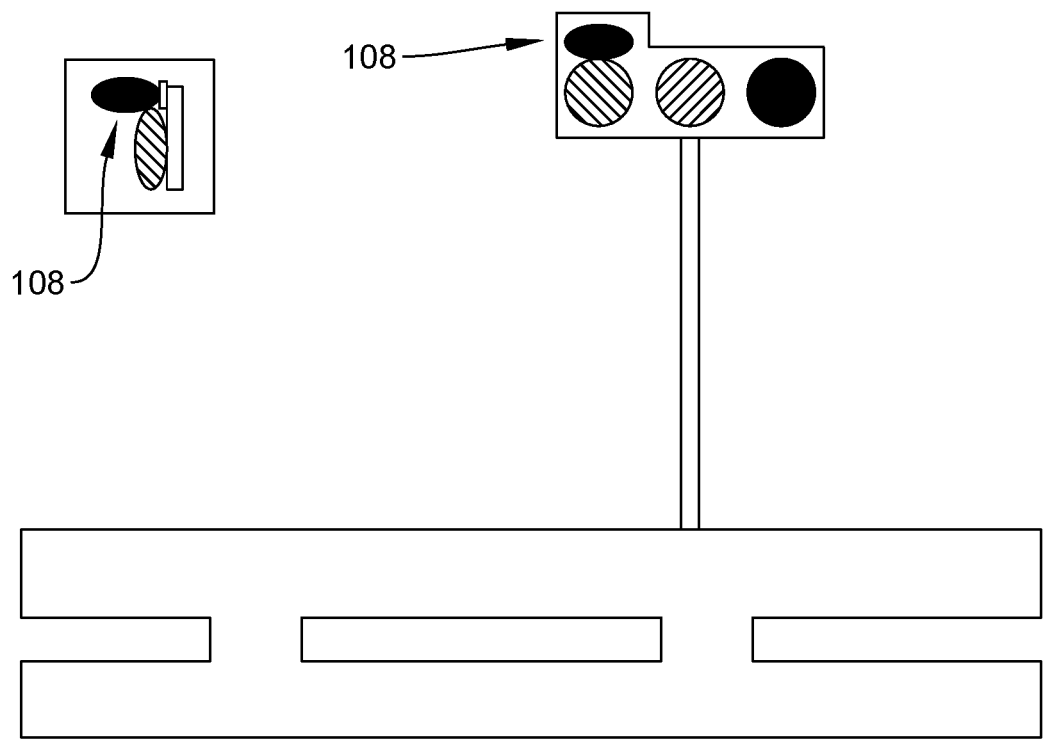
FIG. 3 illustrates schematically the process of controlling traffic lights by the server, according to an embodiment of the present invention.

FIG. 3 illustrates schematically the process of controlling traffic lights by the server 103, according to an embodiment of the present invention. In an embodiment, a pop-up mechanism may be employed. The pop-up mechanism may include an extra light 108 along with the conventional traffic lights at a traffic signal. The color of the extra light 108 added may be blue in an exemplary embodiment. As soon as the microchip 107 installed in the traffic light senses the ambulance (or vice versa), the pop-up mechanism may push down the extra light 108 that may alert drivers (traffic at the signal) of the approaching ambulance and also their estimated waiting time. There might be a situation where cars may be waiting for several minutes and the ambulance is not passing through. The ambulance might have recognized the traffic light but due to some reasons, the ambulance has still not covered the distance of 2 Kms between its location and the traffic light. The drivers waiting there might get frustrated due to them being stuck at red signal. However, this extra light 108 glowing may communicate to them the reason of the delay. Said extra light 108 would flash to indicate that the traffic lights are behaving unusually due to an ambulance approaching. In an embodiment, said light would flash slowly when an ambulance would be far away (>0.5 km) from the traffic light and flash rapidly when the ambulance was closer (<0.5 km).

In another embodiment, there might be a timer fixed with the extra light 108 reflecting the number of minutes the traffic has to wait, and/or how far the ambulance is.

Figure 2H:
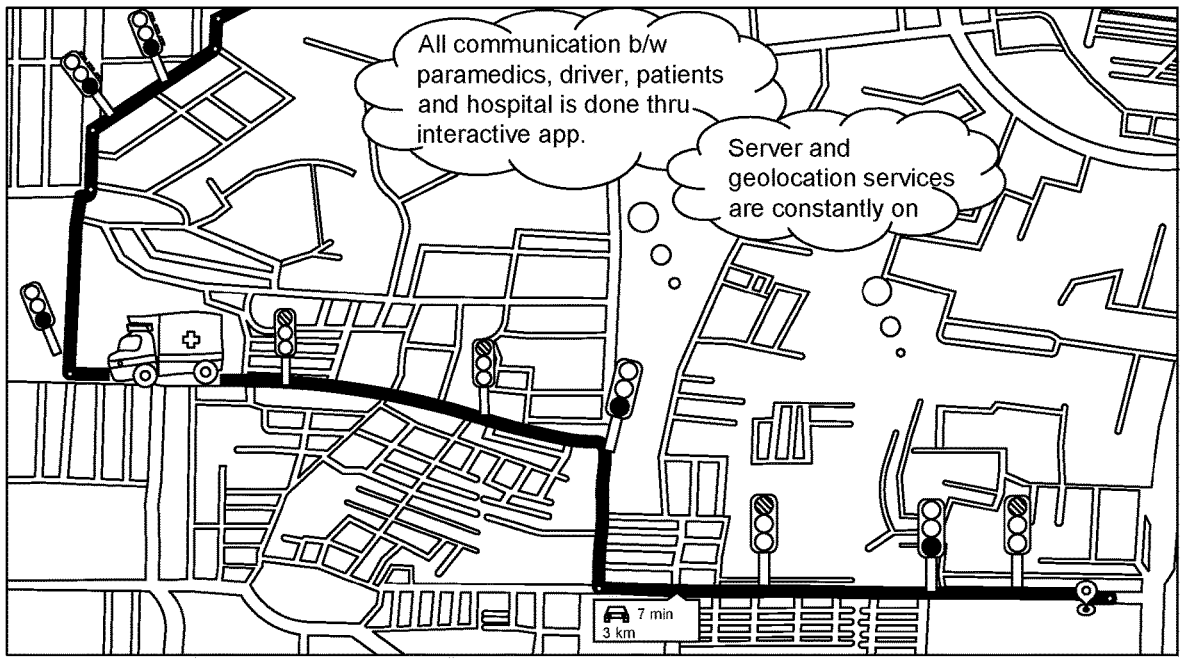
Figure 2I:
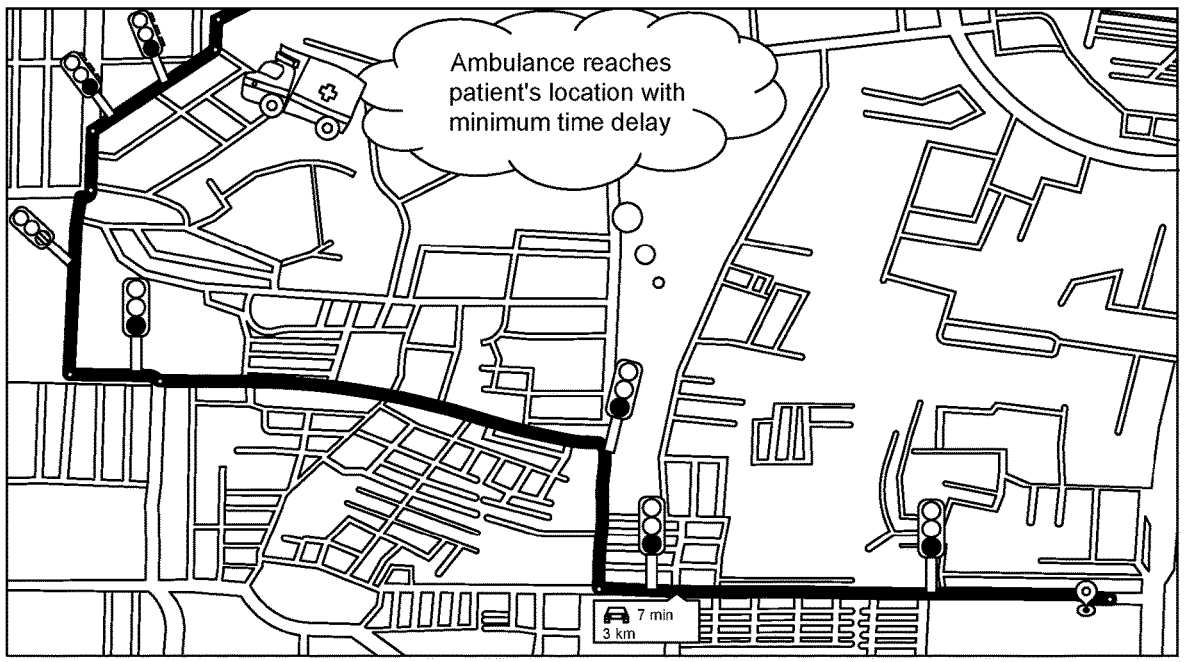

The process of controlling the traffic lights may continue till the ambulance reaches the patient's location and the same has been illustrated in FIG. 2h. The traffic lights may return to normal after the ambulance passes by said location. FIG. 2g illustrates the process of the traffic lighting control after the ambulance passes them. Once the ambulance reaches the patient's location, the geo-location system 104 may update the status on the server 103.

In an embodiment, the driver or medical staff in the ambulance may examine the patient, provide a first aid (in case it is required), and fed all the relevant details in the interactive application. The relevant details may include but not limited to the condition of the patient, type of accident the patient has met with, criticality of the patient, etc. There may be a continuous communication between the paramedics, driver, and patient done through the interactive application. The server 103 and the geo-location systems 104 may be constantly on as illustrated in the FIG. 2i.

In an embodiment, the status of the criticality of the patient may form a part of the required information/detail, the medical staff or the driver are required to enter after examining the patient. In case, while controlling the traffic lights, the traffic lights receive two or more signals from approaching ambulance, the priority criteria that may be considered would be either or both criticality of patient and distance to designated hospital. In other words, if a traffic light senses that two ambulances are approaching, it may give priority on the discussed bases. In an exemplary embodiment, the criticality of the patient may be specified in the following stages and the driver or the examining staff may have to select one of the stages from the list and update it on the interactive application.

The patient's criticality stages are:
  No worrying required (least deadly)—Sprain, Twisted ankle
  Not critical—Broken bones
  Slightly critical—Minorish bleeding, Few sprains
  Most critical—Medium bleeding, Few serious scars
  Super critical—Lots of bleeding, Deep cuts
  Ultra critical—Cancer, COVID-19 bad state
  May die soon—Could die any second In an embodiment, if the IoT server 103 fails to control the traffic lights, the interactive application may be adapted to control the traffic lights. The driver or the paramedic in the ambulance or other as authorized by the system 100 may be able to control the traffic lights by the interactive application.

In an embodiment, based on the location and condition of the patient and availability of hospital, the IoT server 103 may communicate the nearest hospital location to the navigation system 105. The navigation system 105 may navigate the driver to the selected hospital and the driver may start the trip accordingly. The geo-location system 104 may automatically feed to the IoT server 103, the live location of the ambulance moving to the hospital. The IoT server 103 may also recognize the upcoming traffic lights in the same manner as it recognized while moving to the patient. The distance up to which the traffic lights may be recognize may either be same or different depending on the construction of the system 100. The IOT server 103 may take control of all traffic lights as per navigation path within 2 km, and turns them green. The process of controlling the traffic lights continues until the driver reaches the hospital's location and therefore, the trip may end with a minimum delay.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible.

We claim:

1. A smart rescue system (100) comprising:
  a first mobile device (101) configured to request for ambulance services, wherein the request includes patient's home address;
  a network (102);
  a server (103) communicatively coupled with the first mobile device (101) and a plurality of traffic signal posts through the network (102),
  wherein each traffic signal post of the plurality of traffic signal posts includes a set of three traffic lights,
  wherein the server (103) comprises
    a geolocation system (104) to automatically determine an ambulance available in a geo-spatial vicinity of the patient's home address;
    a notification system (106) to notify a driver of the ambulance available in the geo-spatial vicinity of the patient's address; and
    a navigation system (105) to:
      navigate the driver to the patient's home address, based on acceptance of the request by the driver through an interactive application installed in a second mobile device (101) associated with the ambulance; and
      navigate the driver to a nearest medical centre in a geo-spatial vicinity of the patient's address, after reaching the patient's home address;
  a microchip (107) fitted in each traffic signal post of the plurality of traffic signal posts communicating with the server (103) and the ambulance, wherein
    the microchip (107) is configured to transmit a specific signal,
    a receiver fitted in the ambulance is configured to detect the specific signal transmitted from a specific traffic signal post within a specific distance from the ambulance,
    the specific traffic signal post faces the ambulance in its path, and
    the plurality of traffic signal posts includes the specific traffic signal post;
  a pop-up mechanism fitted in each of the plurality of traffic signal posts, wherein
    the server is configured to:
      control the pop-up mechanism to push down an extra green light on the set of three traffic lights included in each of a set of traffic signal posts within a predetermined distance from the ambulance and coming in a way of movement of the ambulance; and
      control the pop-up mechanism to push down an extra red light on the set of three traffic lights included in each traffic signal post other than the set of traffic signal posts within the predetermined distance from the ambulance,
    the extra green light is configured to flash based on a distance between the specific traffic signal post and the ambulance moving towards the specific traffic signal post,
    a frequency of the flash of the extra green light increases with a decrease in the distance between the specific traffic signal post and the ambulance moving towards the specific traffic signal post, after examining the patient, at least one of the driver or a medical staff of the ambulance inputs, via the interactive application installed in the second mobile device (101), a criticality stage of a condition of the patient, and in case of two or more ambulances approaching the specific traffic signal post, the server is further configured to assign a priority level to the ambulance approaching the specific traffic signal post based on the criticality stage of the condition of the patient and a distance to a medical center designated for treating the condition of the patient; and a timer display associated with the extra light, wherein the timer display indicates a time of wait for the traffic, wherein the time of wait is based on the distance between the ambulance and the specific traffic signal post.

2. The smart rescue system (100) as claimed in claim 1, wherein the server (103) stores data entered by a requester of the ambulance services and a live location of the ambulance available.

3. The smart rescue system (100) as claimed in claim 1, wherein the navigation system (105) recognizes upcoming traffic lights up to a distance of 2 km (from the ambulance available) in advance.

4. The smart rescue system (100) as claimed in claim 1, wherein the server (103) comprises:
a memory to store patient details entered by the ambulance driver and examining staff in the ambulance available; and
a communication unit to communicate the stored patient details to the nearest medical center, the navigation system (105) identifies.

5. A method of smart rescue, the method comprising:
requesting, by a first mobile device (101), for ambulance service for a patient;
determining, by a server (103), an ambulance available in a geo-spatial vicinity of the patient's home address;
accepting, by a second mobile device (101), the request for the ambulance by a driver of the ambulance available, wherein the server (103) is communicatively coupled with the first mobile device (101), the second mobile device (101), and a plurality of traffic signal posts through a network (102), wherein each traffic signal post of the plurality of traffic signal posts includes a set of three traffic lights;
navigating, by the server (103), the driver to the patient's home address, based on acceptance of the request by the driver through an interactive application installed in a second mobile device (101) associated with the ambulance;
navigating, by the server (103), the driver to a nearest hospital, after reaching the patient's home address;
communicating, using a microchip fitted in each traffic signal post of the plurality of traffic signal posts, with the server (103) and the ambulance, wherein the microchip (107) is configured to transmit a specific signal, wherein
a receiver fitted in the ambulance is configured to detect the specific signal transmitted from a specific traffic signal post within a specific distance from the ambulance,
the specific traffic signal post faces the ambulance in its path, and the plurality of traffic signal posts includes the specific traffic signal post;
controlling, by the server (103), a pop-up mechanism fitted in the plurality of traffic signal posts to push down an extra green light on the set of three traffic lights included in each of a set of traffic signal posts within a predetermined distance from the ambulance and coming in a way of movement of the ambulance;
controlling the pop-up mechanism to push down an extra red light on the set of three traffic lights included in each traffic signal post other than the set of traffic signal posts within the predetermined distance from the ambulance, wherein
the extra green light is configured to flash based on a distance between the specific traffic signal post and the ambulance moving towards the specific traffic signal post,
a frequency of the flash of the extra green light increases with a decrease in the distance between the specific traffic signal post and the ambulance moving towards the specific traffic signal post,
after examining the patient, at least one of the driver or a medical staff of the ambulance inputs, via the interactive application installed in the second mobile device (101), a criticality stage of a condition of the patient, and
in case of two or more ambulances approaching the specific traffic signal post, the server is further configured to assign a priority level to the ambulance approaching the specific traffic signal post based on the criticality stage of the condition of the patient and a distance to a medical center designated for treating the condition of the patient; and
indicating, using a timer display associated with the extra light, a time of wait for the traffic, wherein the time of wait is based on the distance between the ambulance and the specific traffic signal post.

6. The method as claimed in claim 5, comprising saving details including address of patient, patient's details as provided by requester, live location of the ambulance available, and patient details entered by the ambulance driver and examining staff in the ambulance available, wherein the saved details are communicated to the nearest hospital the server (103) identifies.

* * * * *